United States Patent [19]

Segura et al.

[11] Patent Number: 5,660,759
[45] Date of Patent: Aug. 26, 1997

[54] CATIONIC FORMULATIONS FOR OILING LEATHERS AND SKINS

[75] Inventors: Ramon Segura, Barcelona; Angel Aguado, El Masnou, both of Spain

[73] Assignee: Henkel Kommanditgesellschaft auf Aktien, Duesseldorf, Germany

[21] Appl. No.: 737,284

[22] PCT Filed: Apr. 28, 1995

[86] PCT No.: PCT/EP95/01626

§ 371 Date: Nov. 6, 1996

§ 102(e) Date: Nov. 6, 1996

[87] PCT Pub. No.: WO95/30777

PCT Pub. Date: Nov. 16, 1995

[30] Foreign Application Priority Data

May 6, 1994 [DE] Germany .............. 44 16 111.5

[51] Int. Cl.[6] .................. C14C 9/02; C14C 11/00
[52] U.S. Cl. .............. 252/8.57; 8/94.1 R; 8/94.14; 8/94.19 R; 8/94.22; 8/94.23
[58] Field of Search ............ 252/8.57; 8/94.1 R, 8/94.14, 94.19 R, 94.22, 94.23

[56] References Cited

U.S. PATENT DOCUMENTS

| | | | |
|---|---|---|---|
| 3,366,672 | 1/1968 | Wakeman et al. | 252/8.57 |
| 3,497,482 | 2/1970 | Hwa | 252/8.57 |
| 3,915,867 | 10/1975 | Kang et al. | 510/525 |
| 4,104,175 | 8/1978 | Martinsson et al. | 252/8.57 |
| 4,370,272 | 1/1983 | Weehsler et al. | 554/52 |
| 5,224,963 | 7/1993 | Dix et al. | 8/94.1 R |

FOREIGN PATENT DOCUMENTS

| | | |
|---|---|---|
| 239 910 | 10/1987 | European Pat. Off. . |
| 295 739 | 12/1988 | European Pat. Off. . |
| 293 955 | 12/1988 | European Pat. Off. . |
| 309 052 | 3/1989 | European Pat. Off. . |
| 24 30 140 | 2/1976 | Germany . |
| 3317422 | 11/1986 | Germany ............... 252/8.57 |
| 55-119000 | 9/1980 | Japan ................... 252/8.57 |
| 1 140 520 | 2/1969 | United Kingdom . |
| 91/01295 | 2/1991 | WIPO . |

OTHER PUBLICATIONS

Journal of International Society of Leather Trades Chemists, 379, (1952), p. 47 no month.
Ledertechn.Rundsch. 1 (1949) no month.
J.Am. Leath, Chem. Ass., 239 (1988) p. 83 no month.
Surfactants in Consumer Products, Springer, Berlin, 1987, pp. 54–124 no month.
Catalysts, Surfactants and Mineral Oil Additives, Thieme Verlag, Stuttgart, 1978, pp. 123–217 no month.

*Primary Examiner*—Anthony Green
*Attorney, Agent, or Firm*—Ernest G. Szoke; Wayne C. Jaeschke; Real J. Grandmaison

[57] ABSTRACT

The process of oiling leathers and furs by contacting the leathers and furs with an oiling composition containing esterquats corresponding to formula (I):

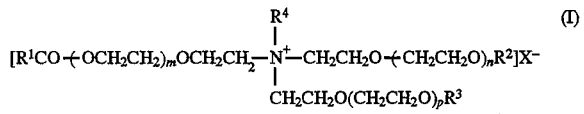

in which $R^1CO$ is an acyl radical containing 6 to 22 carbon atoms, $R^2$ and $R^3$ independently of one another represent hydrogen or have the same meaning as $R^1CO$, $R^4$ is an alkyl radical containing 1 to 4 carbon atoms or a $(CH_2-CH_2O)_qH$ group, m, n and p together represent 0 or numbers of 1 to 12, q is a number of 1 to 12 and X is halide, alkyl sulfate or alkyl phosphate.

7 Claims, No Drawings

CATIONIC FORMULATIONS FOR OILING LEATHERS AND SKINS

BACKGROUND OF THE INVENTION

1. Field of the Invention

This invention relates to formulations for oiling leathers and skins containing selected cationic surfactants and to their use for the production of the formulations.

2. Discussion of Related Art

Apart from tanning agents, oiling formulations are the most important auxiliaries for developing the character of leather. Oiling formulations develop their effect by lubricating and thus insulating the leather fibers and by hydrophobicizing the fibers.

Coating the leather fibers with a fatty film reduces mutual friction and, hence, improves the suppleness and elasticity of the tissue. This has positive effects on the tear strength of leather because, in an elastic material, many fibers on exposure to tensile stress align themselves in the direction in which the stress is applied and, in doing so, offer greater resistance to tearing than the same fibers in a brittle material. In addition, tanning effects are obtained through the hydrophobicization because it involves the displacement of water from the skin.

Leather oiling formulations are generally vegetable and animal oils, fats and waxes, the hydrolysis, sulfonation, oxidation and hydrogenation products obtained from these materials by chemical transformation and, finally, mineral oiling formulations; more specifically:

Saponifiable fats and oils and natural waxes and resins belong to the esters. To the leather expert, oils and fats are understood to be esters of glycerol and fatty acids which are solid or liquid at room temperature. From the group of animal fats, train oils, fish oil, beef tallow and neat's foot oil in particular are used for oiling leather; from the group of vegetable fats, castor oil, rapeseed oil and linseed oil in particular are used. In waxes and resins, the fatty acids are esterified with relatively high molecular weight alcohols instead of glycerol. Examples of waxes are beeswax, Chinese wax, carnauba wax, montan wax and wool grease; the most important resins include colophony, birch bark oil and shellac.

The chemical transformation of vegetable and animal fats gives products which are soluble in water and which, in addition, have an emulsifying effect to varying degrees on water-insoluble fats. Known products of this type are, for example, the sulfonated water-soluble oils of various kinds, train oils modified by oxidation (known as Dégras or Moellon), the soaps obtained in the hydrolysis of natural fats, hydrogenated fats and, finally, free fatty acids, such as stearic acid, as hot-stuffing fats. Most animal and vegetable fats have a certain affinity for leather which can be considerably increased by the introduction or exposure of hydrophilic groups.

Mineral oiling formulations are also important in the manufacture of leather. These hydrocarbons are similar to natural fats and oils in some properties, but cannot be saponified. They are fractions from the distillation of petroleum which are called mineral oil in liquid form, vaseline in paste-like form and paraffin in solid form.

In many cases, however, unwanted stains are formed with time on the surface of the tanned and oiled leather. This phenomenon is known as fatty spew. Fatty spew is formed mainly on chrome-tanned leathers after relatively short or prolonged storage as a white, often bloom-like coating which covers the surface of the leather either locally or completely. The spew is attributable to the egression of solid fats from the leather. It can be caused by the natural fat basically present in the leather or by fats which have been introduced into the leather during the oiling process.

Fatty mixtures used for oiling leather tend to cause fatty spew in particular when they contain large quantities of free fatty acids. Free fatty acids generally have a higher melting point than their glycerides. The hydrolysis of fats during storage of the leather correspondingly increases the danger of fatty spew.

Soaps and fat liquors are hydrolyzed in chrome leather with release of fatty acids, especially in chrome leather which has not been sufficiently deacidified. Sulfonated oils and fats differ in their tendency to form fatty spew, the tendency to form fatty spew generally decreasing with longer life (cf. Journal of International Society of Leather Trades Chemists 47, 379 (1952).

Fatty spew occurs more easily, the more fats with a tendency towards fatty spew which the leather contains. The quantity, composition and position of the fatty mixture of natural fat and fat liquor present in the leather critically determine the extent and the composition of the spew. Leather with a loose structure is less likely to form fatty spew than leather with a dense fiber structure. Fatty spew is observed more commonly at low temperatures than at relatively warm outside temperatures.

The crystalline fatty spew develops in the hair follicles and glandular channels, small crystals initially being formed low down and gradually filling the entire hair follicle as relatively large fatty crystals, spreading over the surface of the leather and matting together to form a dense crystal film. Any fats containing stearin or palmitin derivatives can cause crystalline fatty spew, the danger of spew formation increasing with increasing concentration [cf. Ledertechn. Rundsch. 1 (1949)].

So-called neutral fats, i.e. substances suitable for oiling leather which do not contain any ionic groups in the molecule, for example fats, waxes and hydrocarbons, have a particular tendency to form fatty spew. Neutral fats in the form of stearin and/or palmitin derivatives, for example corresponding triglycerides or the free fatty acids, are particularly critical in this regard.

Since oiling is in any event an almost essential step after tanning in the processing of leather in order to achieve the required product properties, it has become common practice to use special synthetic oiling formulations with only a minimal tendency to form fatty spew.

A class of oils which have been widely used for this purpose are halogenated compounds, such as chlorinated hydrocarbons. Unfortunately, the increasingly more stringent ecological and toxicological requirements which products entering the environment or coming into contact with the consumer are expected to satisfy make this class of compounds increasingly unattractive.

Besides anionic surfactants, for example sulfonated fats and oils or sulfosuccinates, cationic compounds, for example dimethyldistearyl ammonium chloride, are also important as oiling media. A review of this subject by S. Gupta can be found in J. Am. Leath. Chem. Ass. 83, 239 (1988). However, cationic surfactants are ecologically questionable, in addition to which it is known that, in general, they cannot be used together with anionic surfactants because otherwise salts are precipitated on the surface of the leather. Moreover, their performance properties are not always satisfactory.

Accordingly, the complex problem addressed by the invention was to provide new oiling formulations for leathers and skins based on cationic surfactants which would be

3 distinguished by improved ecological and performance properties including, for example, a more pleasant feel and a lower tendency to form fatty spew.

DESCRIPTION OF THE INVENTION

The present invention relates to cationic formulations for oiling leathers and skins which contain 1 to 30% by weight of esterquats.

It has surprisingly been found that esterquats not only have advantageous ecotoxicological compatibility compared with conventional cationic surfactants, they also provide leathers with improved suppleness, a more pleasant feel and increased hydrophobicization. At the same time, a lower tendency to form unwanted fatty spew is observed.

Esterquats

Esterquats are generally understood to be quaternized fatty acid triethanolamine ester salts. They are known substances which may be obtained by the relevant methods of preparative organic chemistry. Reference is made in this connection to International patent application WO 91/01295 (Henkel), according to which triethanolamine is partly esterified with fatty acids in the presence of hypophosphorous acid, air is passed through and the reaction mixture is subsequently quaternized with dimethyl sulfate or ethylene oxide. U.S. Pat. No. 3,915,867, U.S. Pat. No. 4,370,272, EP-A2 0 239 910, EP-A2 0 293 955, EP-A2 0 295 739 and EP-A2 0 309 052 are cited at this juncture as representative of the extensive prior art.

The quaternized fatty acid triethanolamine ester salts correspond to formula (I):

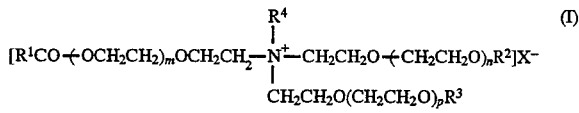

in which $R^1CO$ is an acyl radical containing 6 to 22 carbon atoms, $R^2$ and $R^3$ independently of one another represent hydrogen or have the same meaning as $R^1CO$, $R^4$ is an alkyl radical containing 1 to 4 carbon atoms or a $(CH_2-CH_2O)_qH$ group, m, n and p together represent 0 or numbers of 1 to 12, q is a number of 1 to 12 and X is halide, alkyl sulfate or alkyl phosphate.

Typical examples of esterquats which may be used in accordance with the invention are products based on caproic acid, caprylic acid, capric acid, lauric acid, myristic acid, palmitic add, isostearic acid, stearic acid, oleic acid, elaidic acid, arachic acid, behenic acid and erucic acid and the technical mixtures thereof obtained, for example, in the pressure hydrolysis of natural fats and oils. Technical $C_{12/18}$ cocofatty acids and, more particularly, partly hydrogenated $C_{16/18}$ tallow fatty acid or palm oil fatty acid and also $C_{16/18}$ fatty acid cuts rich in elaidic acid are preferably used.

To produce the quaternized esters, the fatty acids and the triethanolamine may be used in a molar ratio of 1.1:1 to 3:1. So far as the performance properties of the esterquats are concerned, a ratio of 1.2:1 to 2.2:1 and preferably 1.5:1 to 1.9:1 has proved to be particularly advantageous. The preferred esterquats are technical mixtures of mono-, di- and triesters with an average degree of esterification of 1.5 to 1.9 and are derived from technical $C_{16/18}$ tallow fatty acid or palm oil fatty acid (iodine value 0 to 40).

Quaternized fatty acid triethanolamine ester salts corresponding to formula (I), in which $R^1CO$ is an acyl radical containing 16 to 18 carbon atoms, $R^2$ has the same meaning as $R^1CO$, $R^3$ is hydrogen, $R^4$ is a methyl group, m, n and p=0 and X stands for methyl sulfate, have proved to be particularly advantageous from the performance point of view.

In addition to the quaternized fatty acid triethanolamine ester salts, other suitable esterquats are quaternized ester salts of fatty acids with diethanol alkylamines corresponding to formula (II):

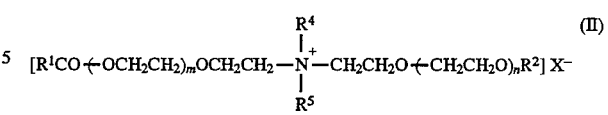

in which $R^1CO$ is an acyl radical containing 6 to 22 carbon atoms, $R^2$ is hydrogen or has the same meaning as $R^1CO$, $R^4$ and $R^5$ independently of one another represent alkyl radicals containing 1 to 4 carbon atoms, m and n together are 0 or numbers of 1 to 12 and X stands for halide, alkyl sulfate or alkyl phosphate.

Finally, another group of suitable esterquats are the quaternized ester salts of fatty acids with 1,2-dihydroxypropyl dialkylamines corresponding to formula (III):

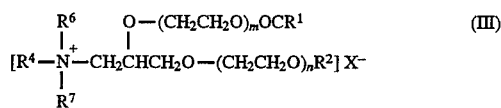

in which $R^1CO$ is an acyl radical containing 6 to 22 carbon atoms, $R^2$ is hydrogen or has the same meaning as $R^1CO$, $R^4$, $R^6$ and $R^7$ independently of one another represent alkyl radicals containing 1 to 4 carbon atoms, m and n together are 0 or numbers of 1 to 12 and X stands for halide, alkyl sulfate or alkyl phosphate.

So far as the choice of the preferred fatty acids and the optimal degree of esterification are concerned, the examples mentioned in respect of (I) also apply to the esterquats corresponding to formulae (II) and (III). The esterquats are normally marketed in the form of 50 to 90% by weight solutions in alcohol which, if required, may readily be diluted with water.

Co-surfactants

The invention includes the observation that esterquats containing ethylene oxide units in particular may also be used together with other nonionic, amphoteric or zwitterionic and preferably anionic surfactants without unwanted salt-like deposits being formed on the surface of the leather.

Typical examples of anionic surfactants are alkylbenzenesulfonates, alkanesulfonates, olefin sulfonates, alkylether sulfonates, glycerol ether sulfonates, α-methyl ester sulfonates, sulfofatty acids, alkylsulfates, fatty alcohol ether sulfates, glycerol ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, acyl lactylates, alkyl oligoglucoside sulfates and alkyl (ether) phosphates. If the anionic surfactants contain polyglycol ether chains, they may have a conventional homolog distribution although they preferably have a narrow-range homolog distribution.

Typical examples of nonionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, alk(en)yl oligoglycosides, fatty acid N-alkyl glucamides, polyol fatty acid esters, sugar esters, sorbitan esters and polysorbates. If the nonionic surfactants contain polyglycol ether chains, they may have a conventional homolog distribution, although they preferably have a narrow-range homolog distribution.

Typical examples of amphoteric or zwitterionic surfactants are alkylbetaines, alkylamidobetaines, aminopropionates, aminoglycinates, imidazolinium betaines and sulfobetaines.

The surfactants mentioned are all known compounds. Information on their structure and production can be found in relevant synoptic works, cf. for example J. Falbe (ed.), "Surfactants in Consumer Products", Springer Verlag, Berlin, 1987, pages 54 to 124 or J. Falbe (ed.), "Katalysatoren, Tenside und Mineralöladditive (Catalysts, Surfactants and Mineral Oil Additives)", Thieme Verlag, Stuttgart, 1978, pages 123–217.

Oiling formulations

In addition to esterquats and other surfactants, the oiling formulations may contain other typical auxiliaries and additives. The percentage content of esterquats in the formulations according to the invention is normally from 15 to 90% by weight and preferably from 20 to 80% by weight, based on the formulation. The formulations are generally applied in such a quantity that there are from 20 to 1,000 and preferably from 30 to 80 g of the formulation to 1 kg of leather or skin (expressed as pared weight).

COMMERCIAL APPLICATIONS

As a constituent of oiling formulations, esterquats provide leathers and skins with improved lardiness and suppleness, a pleasant feel and increased hydrophobicity. Colors come out very bright and even.

Accordingly, the present invention also relates to the use of esterquats as cationic surfactants for oiling leathers and skins.

The following Examples are intended to illustrate the invention without limiting it in any way.

EXAMPLES

Example 1

Production of sheepskin clothing leather. Wet blue material was first washed and then retanned. The quantities used and duration of the individual process steps are shown in Table 1. All percentages are based on the pared weight.

TABLE 1

Production of Sheepskin Clothing Leather

| Process | Addition of | Quantity % by weight | Duration mins. |
|---|---|---|---|
| Washing | Water (40° C.) | 200 | 10 |
|  | New liquor |  |  |
|  | Water (40° C.) | 100 | 40 |
|  | Sodium triformate | 1 |  |
|  | Sodium bicarbonate | 1 |  |
|  | Acrylate tanning agent | 3 |  |
|  | Rinse off liquor (50° C.) |  |  |
| Retanning, dyeing | Water (50° C.) | 100 | 30 |
|  | Naphthalene condensate | 2 |  |
|  | Dye | 3 | 30 |
|  | Esterquat I[1)] | 3 | 40 |
|  | Sulfated ester oil | 2 | 40 |
|  | Sulfited ester oil | 3 | 40 |
|  | Acrylate tanning agent | 2 | 60 |
|  | Formic acid | 1 | 15 |
|  | Rinse off liquor (50° C.) |  |  |

[1)]Reaction product of partly hydrogenated palm oil fatty acid with triethanolamine 2EO adduct (molar ratio 1.64:1), methyl-quaternized, methyl sulfate salt A soft leather with a full round feel and a uniform flowery color was obtained.

Example 2

Production of furniture leather. Wet blue material was washed, retanned, neutralized, dyed and oiled. The quantities used and duration of the individual process steps are shown in Table 2. All percentages are based on the pared weight.

TABLE 2

Production of Furniture Leather

| Process | Addition of | Quantity % by weight | Duration mins. |
|---|---|---|---|
| Washing | Water (45° C.) | 200 | 10 |
|  | New liquor |  |  |
| Retanning, | Water (45° C.) | 100 | 45 |
|  | Chromium sulfate (33% by weight) | 2 |  |
|  | Phenol condensate | 2 |  |
|  | Sodium aluminium silicate | 1 |  |
|  | Rinse off liquor (40° C.) |  |  |
| Neutralization | Water (40° C.) | 100 | 60 |
|  | Sodium bicarbonate | 2 |  |
|  | New liquor |  |  |
| Dyeing and Oiling | Water (50° C.) | 100 | 15 |
|  | Naphthalene condensate | 2 |  |
|  | Ammonia | 1 |  |
|  | Dye | 3 | 45 |
|  | Esterquat I | 2 | 45 |
|  | Sulfated ester oil | 5 |  |
|  | Sulfited ester oil | 4 |  |
|  | Formic acid | 1 | 15 |
|  | Formic acid | 2 | 30 |
|  | Rinse off liquor (40° C. |  |  |

Soft, pleasantly warm and slightly lardy furniture leathers were obtained.

Example 3

Production of suede. Crust leather was napped and dyed. The quantities used and duration of the individual process steps are shown in Table 3. all percentages are based on the pared weight.

TABLE 3

Production of Suede

| Process | Addition of | Quantity % by weight | Duration mins. |
|---|---|---|---|
| Napping | Alkyl ether phosphate | 1 | 240 |
|  | ammonia | 1 |  |
| Dyeing | Water (60° C.) | 300 | 60 |
|  | Phenol condensate | 2 |  |
|  | Ammonia | 1 |  |
|  | Dye | 7 |  |
|  | Formic acid | 4 | 45 |
|  | Esterquat II[2)] | 2.5 | 30 |
|  | Wash thoroughly |  |  |

[2)]Reaction product of partly hydrogenated palm oil fatty acid with triethanolamine (molar ratio 1.9:1), methyl-quaternized, methyl sulfate salt, Dehyquart ® AU 46, a product of Pulcra S.A., Barcelona, Spain.

A brightly colored silky suede leather with an attractive writing effect was obtained.

Example 4

Production of hide upper leather. Wet blue material was washed, neutralized, rewashed and retanned. The quantities used and duration of the individual process steps are shown in Table 4. all percentages are based on the pared weight.

TABLE 4

Production of Hide Upper Leather

| Process | Addition of | Quantity % by weight | Duration mins. |
|---|---|---|---|
| Washing | Water (40° C.) | 200 | 10 |
|  | New liquor |  |  |
| Neutralization | Water (40° C.) | 100 | 15 |
|  | Sodium formate | 0.5 |  |
|  | Sodium aluminium silicate | 0.5 |  |
| Washing | Water (60° C.) | 100 | 10 |
|  | New liquor |  |  |
| Retanning | Water (60° C.) | 100 | 15 |
|  | Naphthalene condensate | 2 |  |
|  | Dye | 1 | 15 |
|  | Acrylate tanning agent | 2 | 15 |
|  | Phenol condensate | 3 | 30 |
|  | Esterquat III[3)] | 3 | 45 |
|  | Sulfated fish oil | 3 |  |
|  | Formic acid | 0.5 | 15 |

[3)]Reaction product of partly hydrogenated palm oil fatty acid with triethanolamine 1EO adduct (molar ratio 1.64:1), methyl-quaternized, methyl sulfate salt A very soft full leather with a uniform, bright color finish was obtained.

Comparison Examples C1 to C4

Examples 1 to 4 were repeated except that the various esterquat types were replaced by dimethyl distearyl ammonium chloride. The resulting leathers had a distinctly harder feel and less lardiness. In addition, surface precipitations were observed.

What is claimed is:

1. The process of oiling leathers and furs comprising contacting said leathers and furs with an oiling composition containing esterquats corresponding to formula (I):

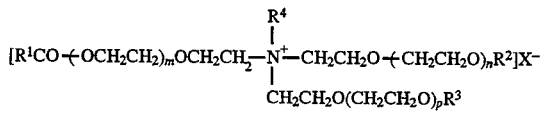

in which $R^1CO$ is an acyl radical containing 6 to 22 carbon atoms, $R^2$ and $R^3$ independently of one another represent hydrogen or have the same meaning as $R^1CO$, $R^4$ is an alkyl radical containing 1 to 4 carbon atoms or a $(CH_2-CH_2O)_qH$ group, m, n and p together represent 0 or numbers of 1 to 12, q is a number of 1 to 12 and X is halide, alkyl sulfate or alkyl phosphate.

2. A process as in claim 1 wherein $R^1CO$ is an acyl radical containing 16 to 18 carbon atoms, $R^2$ has the same meaning as $R^1CO$, $R^3$ is hydrogen, $R^4$ is a methyl group, m, n and p are equal to zero, and X is methyl sulfate.

3. The process of claim 1, wherein said esterquats are present in said oiling composition in an amount of 1% to 30% by weight, based on the weight of said oiling composition.

4. The process of oiling leathers and furs comprising contacting said leathers and furs with an oiling composition containing esterquats corresponding to formula (II):

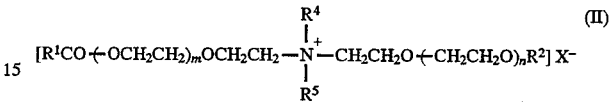

in which $R^1CO$ is an acyl radical containing 6 to 22 carbon atoms, $R^2$ is hydrogen or has the same meaning as $R^1CO$, $R^4$ and $R^5$ independently of one another represent alkyl radicals containing 1 to 4 carbon atoms, m and n together are 0 or numbers of 1 to 12, and X stands for halide, alkyl sulfate or alkyl phosphate.

5. The process of claim 4 wherein said esterquats are present in said oiling composition in an amount of 1% to 30% by weight, based on the weight of said oiling composition.

6. The process of oiling leathers and furs comprising contacting said leathers and furs with an oiling composition containing esterquats corresponding to formula (III):

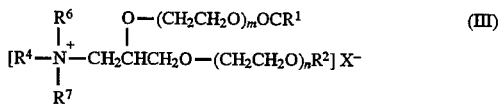

in which $R^1CO$ is an acyl radical containing 6 to 22 carbon atoms, $R^2$ is hydrogen or has the same meaning as $R^1CO$, $R^4$, $R^6$ and $R^7$ independently of one another represent alkyl radicals containing 1 to 4 carbon atoms, m and n together are 0 or numbers of 1 to 12, and X stands for halide, alkyl sulfate or alkyl phosphate.

7. The process of claim 6 wherein said esterquats are present in said oiling composition in an amount of 1% to 30% by weight, based on the weight of said oiling composition.

* * * * *